United States Patent
Dupaquis

(10) Patent No.: US 9,780,946 B2
(45) Date of Patent: Oct. 3, 2017

(54) ELLIPTIC CURVE ENCRYPTION METHOD COMPRISING AN ERROR DETECTION

(71) Applicant: INSIDE SECURE, Meyreuil (FR)

(72) Inventor: Vincent Dupaquis, Biver (FR)

(73) Assignee: Inside Secure, Meyreuil (FR)

( * ) Notice: Subject to any disclaimer, the term of this patent is extended or adjusted under 35 U.S.C. 154(b) by 0 days.

(21) Appl. No.: 14/818,684

(22) Filed: Aug. 5, 2015

(65) Prior Publication Data
US 2016/0043863 A1 Feb. 11, 2016

(30) Foreign Application Priority Data
Aug. 5, 2014 (FR) ...................................... 14 57603

(51) Int. Cl.
*H04L 9/00* (2006.01)
*G06F 7/72* (2006.01)
*H04L 9/30* (2006.01)

(52) U.S. Cl.
CPC ............... *H04L 9/004* (2013.01); *G06F 7/725* (2013.01); *H04L 9/3066* (2013.01); *G06F 2207/7271* (2013.01)

(58) Field of Classification Search
CPC .......... G06F 7/724; G06F 7/727; G06F 7/728; H04L 9/3066
See application file for complete search history.

(56) References Cited

U.S. PATENT DOCUMENTS

| 7,418,099 B2 * | 8/2008 | Vanstone | ................ G06F 7/725 380/263 |
| 2011/0307698 A1 * | 12/2011 | Vanstone | .............. H04L 9/0825 713/171 |

FOREIGN PATENT DOCUMENTS

EP 2211265 A1 7/2010

OTHER PUBLICATIONS

Junfeng Fan et al., "To Infinity and Beyond: Combined Attack on ECC Using Points of Low Order", Cryptographic Hardware and Embedded Systems (CHES) 2011, Proceedings of the 13th International Workshop, Nara Japan, Sep. 28-Oct. 1, 2011, pp. 1-17.*
Fan, J. et al., "To Infinity and Beyond: Combined Attack on ECC Using Points of Low Order," CHES 2011, LNCS 6917, 2011, pp. 143-159.

(Continued)

Primary Examiner — Eleni Shiferaw
Assistant Examiner — Paul Callahan
(74) Attorney, Agent, or Firm — Brake Hughes Bellermann LLP

(57) ABSTRACT

A method in an elliptic curve cryptographic system, the method being executed by an electronic device and including a multiplication operation of multiplying a point of an elliptic curve by a scalar number, the point having affine coordinates belonging to a Galois field, the multiplication operation including steps of detecting the appearance of a point at infinity during intermediate calculations of the multiplication operation, and of activating an error signal if the point at infinity is detected and if the number of bits of the scalar number processed by the multiplication operation is lower than the rank of the most significant bit of an order of a base point of the cryptographic system.

19 Claims, 3 Drawing Sheets

(56) References Cited

OTHER PUBLICATIONS

Figure 1:
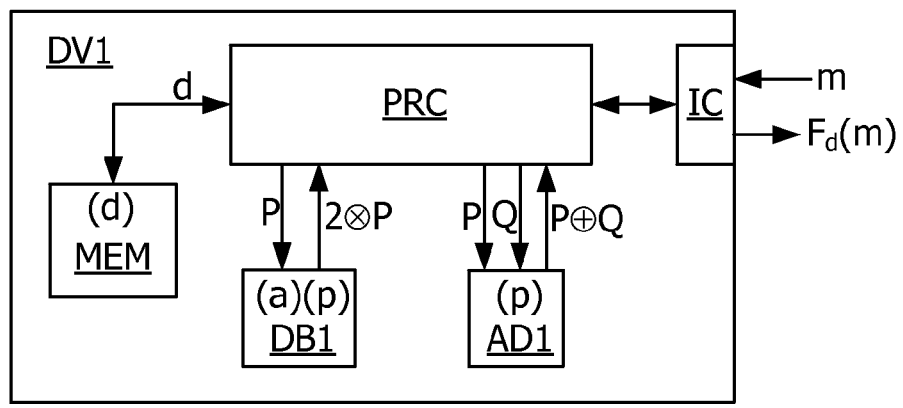

Medwed, Marcel et al., "Radomizing the Montgomery Multiplication to Repel Template Attacks on Multiplicative Masking." Graz Univerisity of Technology. Institute of Applied Information Processing and Communications. Jan. 1, 2010.
Mölller, Bodo. "Securing Elliptic Curve Point Multiplication against Side-Channel Attacks." pp. 324-334. Information Security-ISC 2001, Springer-Verlag LNCS 2200. Oct. 1, 2001.

* cited by examiner

ELLIPTIC CURVE ENCRYPTION METHOD COMPRISING AN ERROR DETECTION

The present invention relates to the implementation of an elliptic curve encryption method in an electronic device, and in particular the detection of an attack during the execution of cryptographic calculations by such a device.

Various known elliptic curve cryptography methods are based on scalar multiplication, the mathematical expression of which is: $k \otimes P = P \oplus P \oplus \ldots \oplus P$ (k times), P being a point chosen on an elliptic curve, k being a whole number, and "$\oplus$" being the adding operator applied to points of the elliptic curve. The number k may be used for example as a private key and the point $k \otimes P$ resulting from this operation, or one of the affine coordinates of this point, may be used as a public key corresponding to the private key k. Indeed, it can be extremely difficult to find the value of the number k from the result $k \otimes P$ and the coordinates of the point P, in particular when the number k and the coordinates of the point P are chosen sufficiently high. This operation is used for example during a signature calculation, or to generate a cryptography key, or even to cipher a message. This operation is implemented by various cryptography algorithms based on elliptic curves, such as the ECDSA ("Elliptic Curve Digital Signature Algorithm"), ECDH (Elliptic Curve Diffie-Hellman), and ECIES (Elliptic Curve Integrated Encryption Scheme).

The operations between points of an elliptic curve amount to operations on the coordinates of these points in Galois fields of the form $GF(q^m)$, $q^m$ defining the field, q being a prime number, and m being a whole number. In encryption based on elliptic curves, either q is chosen equal to a big prime number p and m is chosen equal to 1, or q is chosen equal to 2 and m is a big whole number. The scalar multiplication operation is generally broken down into several iterations each comprising operations of adding and doubling points. Certain scalar multiplication algorithms comprise for each iteration, i.e. each bit of the scalar number, an addition of two identical points of the elliptic curve, and if the bit of the scalar processed by the iteration is equal to 1, an addition of the point R with another point P of the elliptic curve. Different functions are generally used to execute each of these operations, the addition of two identical points being executed by means of a doubling function, whereas the addition of two different points is executed by means of an adding function. This distinction is due to the fact that the calculation formulas of the adding function are not generally applicable if the points to be added are identical. Indeed, in certain coordinate systems, the addition of two identical points can result in a division by zero.

In a smart-card-type electronic device, cryptographic calculations or a part of these calculations are generally executed by a specific processor, such as an arithmetic coprocessor or a crypto-processor. The multiplication of a point by a scalar number "$k \otimes P$", and more particularly the execution of additions and doubling of points of an elliptic curve, occupies the majority of the computing time of the processor relative to the total time it takes to generate a key, calculate a signature, check the signature, or perform a ciphering or deciphering operation. Elliptic curve encryption is vulnerable to certain attacks, particularly those consisting of causing faults in an integrated circuit during the execution of cryptographic calculations, in order to discover secret data such as cryptographic keys.

It is thus desirable for an electronic device performing elliptic curve cryptographic calculations to be protected against such attacks. It is also desirable to be able to perform such a detection as soon as possible during the execution of a cryptographic calculation. Indeed, the simple execution of a cryptographic calculation on incorrect data may reveal a part of a secret datum. As a result, detecting a fault injection only at the end of a calculation may be ineffective.

Some embodiments relate to a cryptographic calculation method in an elliptic curve cryptographic system, the method being executed by an electronic device and comprising a multiplication operation of multiplying a point of an elliptic curve by a scalar number, the point having affine coordinates belonging to a Galois field. According to one embodiment, the method comprises steps of: detecting the appearance of a point at infinity during intermediate calculations of the multiplication operation, and activating an error signal if the point at infinity is detected and if the number of bits of the scalar number processed by the multiplication operation is lower than the rank of the most significant bit of an order of a base point of the cryptographic system.

According to one embodiment, the method comprises a step of activating the error signal if the point at infinity has been detected at input of an intermediate calculation of the multiplication operation, if an adding and/or doubling operation of adding and/or doubling a point has been executed, and if the number of processed bits of the scalar number is lower than the rank of the most significant bit of the order of the base point.

According to one embodiment, the intermediate calculation comprises an addition of points of the elliptic curve.

According to one embodiment, the intermediate calculation comprises an operation of doubling a point of the elliptic curve.

According to one embodiment, the method comprises steps of activating an error detection mode only when the number of processed bits of the scalar number is lower than the rank of the most significant bit of the order of the base point, wherein the error signal can only be activated when the error detection mode is activated.

According to one embodiment, the method comprises a step of detecting the appearance of the point at infinity before and/or after an operation of adding points, and/or before and/or after an operation of doubling a point.

According to one embodiment, the method comprises a step of using as point resulting from the intermediate calculation, a point having an arbitrary value, when the error signal is active.

According to one embodiment, the method comprises a step of allocating an arbitrary value to the scalar number, when the error signal is active.

Some embodiments also relate to an electronic device comprising a processor configured to implement the method previously defined.

According to one embodiment, the device comprises an adding calculation block for calculating the addition of points of an elliptic curve and a doubling calculation block for calculating the doubling of a point of the elliptic curve.

According to one embodiment, the adding calculation block and/or the doubling calculation block are configured to detect the appearance of the point at infinity, and to activate an error signal if an error detection mode is activated.

According to one embodiment, the device is configured to detect the appearance of the point at infinity and to activate an error signal, if an error detection mode is activated, before and/or after the adding calculation block is activated to perform an adding operation, and/or before and/or after the doubling calculation block is activated to perform a doubling operation.

Figure 2:
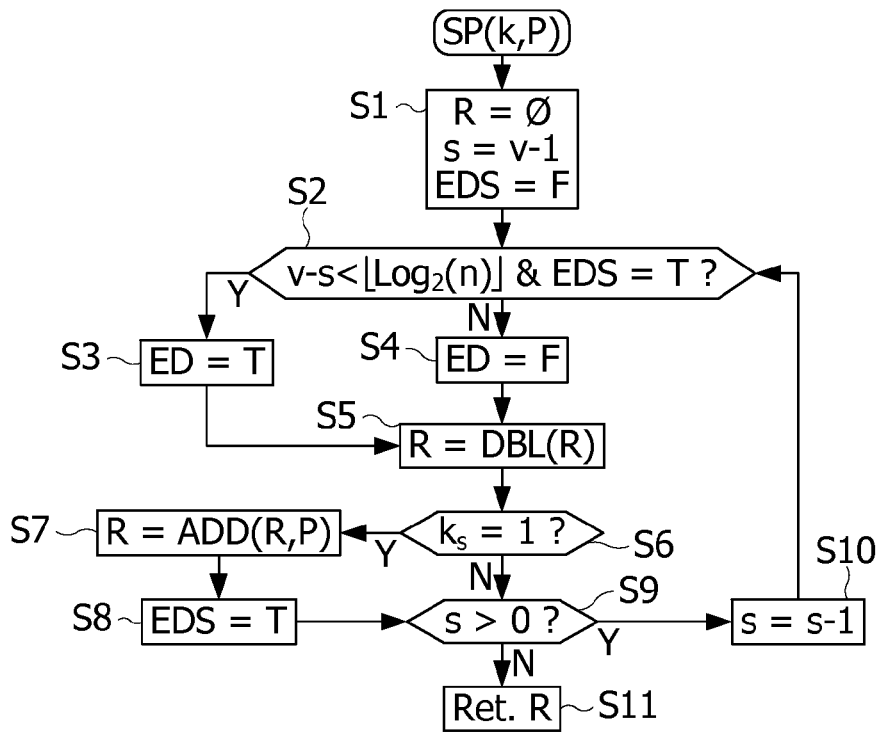
Figure 3:
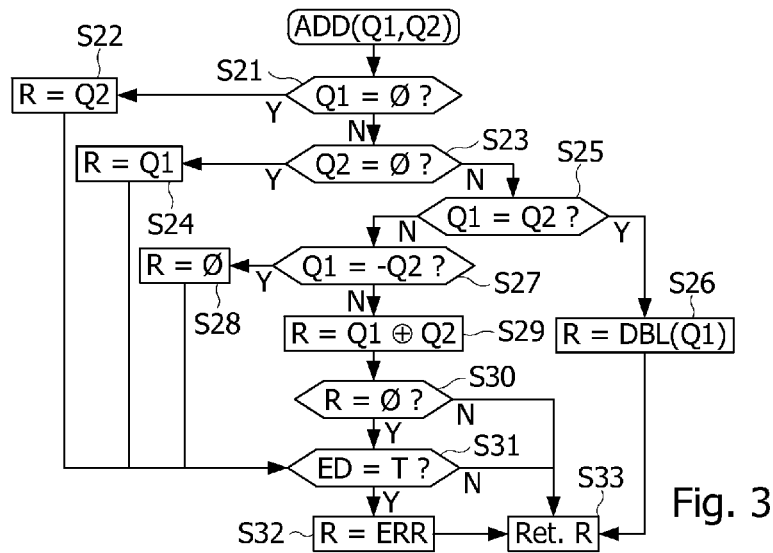
Figure 4:
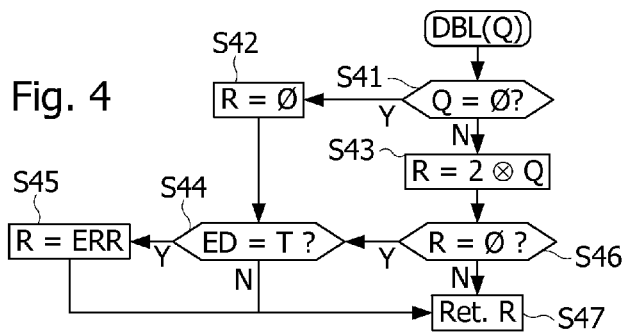
Figure 5:
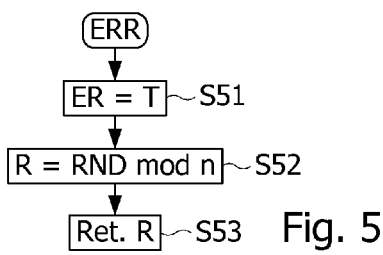
Figure 6:
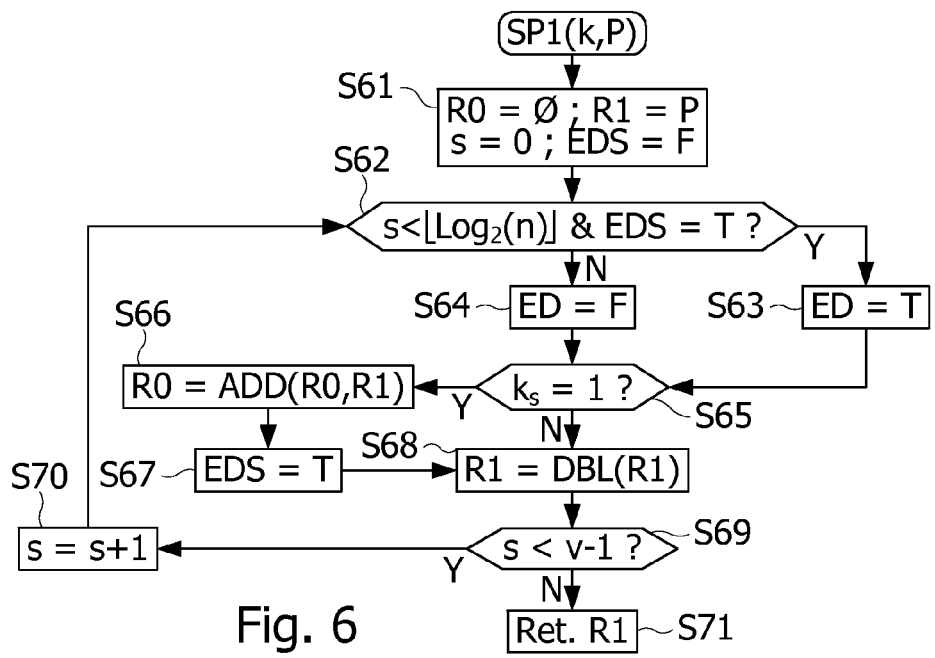
Figure 7:
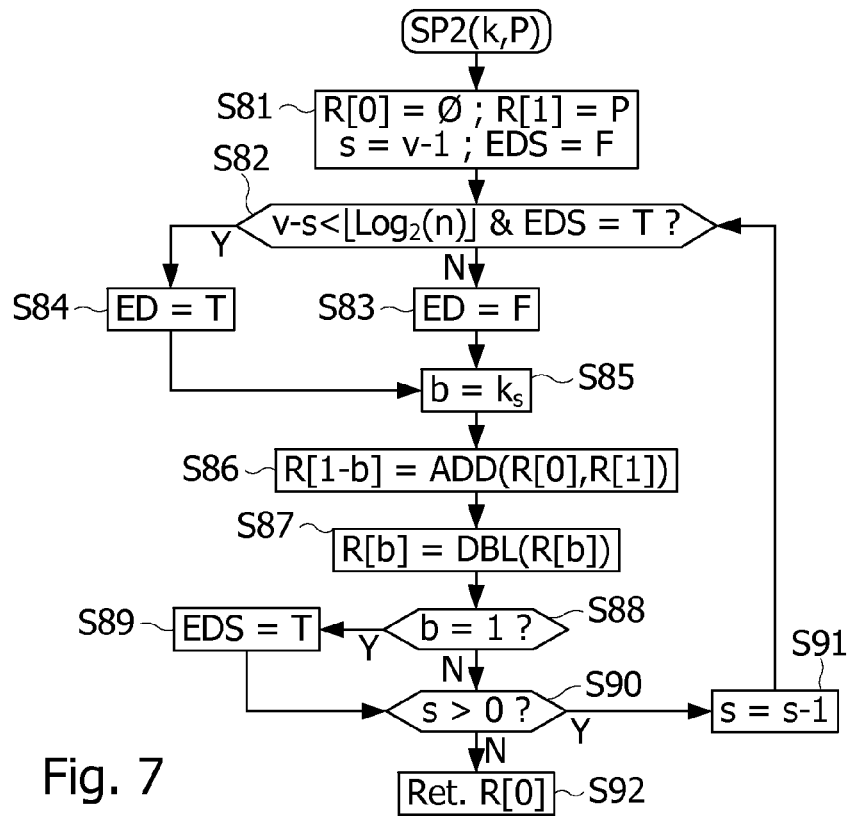

Some examples of embodiments of the present invention will be described below in relation with, but not limited to, the accompanying figures, in which:

FIG. 1 schematically represents an electronic device comprising an elliptic curve cryptographic calculation circuit, according to one embodiment, FIG. 2 represents steps of a multiplication function for multiplying a point of an elliptic curve by a scalar number, according to one embodiment, FIG. 3 represents steps of an adding function for adding two points of an elliptic curve, integrating a protection against fault injections, according to one embodiment, FIG. 4 represents steps of a doubling function for doubling a point of an elliptic curve, integrating a protection against fault injections, according to one embodiment, FIG. 5 represents steps of an error processing procedure, according to one embodiment, FIGS. 6 and 7 represent steps of multiplication functions for multiplying a point of an elliptic curve by a scalar number, according to other embodiments.

An elliptic curve cryptographic system generally requires the definition of so-called "domain" parameters. In the case of a Galois field of GF(p) or GF($2^m$) type, these parameters comprise a big prime number p or a big whole number m, a generating point or base point G, of coordinates Gx, Gy in the Galois field, a prime number n referred to as "order" of the point G, such that n·G=Ø, Ø being the point at infinity or the neutral element of the Galois field, parameters defining an elliptic curve, a number f referred to as "cofactor", generally equal to 1, 2 or 4, such that fn represents the number of points of the elliptic curve. In a Galois field of GF(p) type, the elliptic curve may for example have an equation such as E(a,b): $y^2=x^3+ax+b$. In such an elliptic curve, the opposite of a point P of affine coordinates (x, y) is the point −P of coordinates (x, −y).

FIG. 1 represents in block diagram form an electronic device DV1 configured to execute cryptographic calculations including products of points of an elliptic curve by a scalar number, applied to big numbers. The device DV1 can be an integrated circuit on a semiconductor chip arranged on a portable medium like a plastic card, the assembly forming a smart card. The device DV1 can also be any device equipped with a multi-task processor, such as a smartphone, a multimedia player, a tactile tablet or a personal computer. The device DV1 can also be a component of such a device, for example coupled to a main processor of the device.

The device DV1 comprises a processor PRC, a calculation block AD1 configured to execute an addition of points P and Q belonging to an elliptic curve and the affine coordinates of which belong to the Galois field, a calculation block DB1 configured to execute a doubling of a point P belonging to the elliptic curve, a memory MEM and a communication interface circuit IC. The calculation blocks AD1, DB1 have the parameter p of the cryptographic system, the block DB1 further has the parameter a defining the elliptic curve of the cryptographic system. The calculation blocks AD1, DB1 may each comprise a coprocessor equipped with a programmable central unit, or an entirely hardware coprocessor of state machine type. The calculation blocks AD1, DB1 may simply correspond to a function called by a main program executed in particular by the processor PRC. The two calculation blocks AD1, DB1 may also be integrated into a same component (coprocessor or state machine). The interface circuit IC can be of the contact or contactless type, for example an RF or UHF interface circuit operating by inductive coupling or by electrical coupling.

In a conventional manner per se, a variable is said to be "big" when its size (in number of bits) is greater than that of the calculation registers of the processor PRC. The latter itself performs, without using the calculation blocks AD1, DB1, operations of numbers that are smaller than or equal to the size of its calculation registers, and uses the calculation blocks AD1, DB1 to perform adding and doubling operations concerning elliptic curve points having big coordinates. For example, if the size of the calculation registers of the processor PRC is 32 bits, a big variable is a variable of more than 32 bits. In elliptic curve cryptography, the variables handled (coordinates of the points of elliptic curves, parameters p—modulus, b, Gx, Gy—coordinates of the base point G, n—order of the base point) can reach several hundreds of bits (typically for example 160, 192, 224, 256, 320, 384, 521 bits).

The memory MEM is coupled to the processor PRC and enables the device DV1 to store a secret key k. The processor PRC receives, through the interface circuit IC, a message m to be ciphered, deciphered, or signed, or a signature to be checked, and sends back a ciphered or deciphered message, or a signature, of the $F_k$(m) type, $F_k$ being a cryptography function based on the key k, comprising a scalar multiplication calculation executed by the processor PRC. During the scalar multiplication calculation, the processor PRC uses the calculation blocks AD1, DB1, by providing points P, Q to the calculation block AD1 which sends back the sum P⊕Q, and by providing a point P to the calculation block DB1 which sends back the double 2⊗P.

In the elliptic curve E(a,b) the equation of which is $y^2=x^3+ax+b$ on a Galois field of GF(p) type, the sum of two points P1(x1,y1) and P2(x2,y2) provides a point P3(x3, y3)=P1⊕P2 which can be calculated using the following equation:

$$\begin{vmatrix} x3 = m1^2 - x1 - x2 \\ y3 = m1(x1 - x3) - y1 \end{vmatrix}, \text{with: } m1 = (y2 - y1)/(x2 - x1) \qquad (1)$$

The equation (1) can be used if the point P2 is different from the points P1 and −P1. Therefore, the equation (1) cannot apply if the points to be added are identical or opposite. The doubling of a point P(x,y) provides a point P4(x4, y4)=2⊗P which can be calculated using the following equation:

$$\begin{vmatrix} x4 = m2^2 - 2x \\ y4 = m2(x - x4) - y \end{vmatrix}, \text{with: } m2 = (3x^2 + a)/2y \qquad (2)$$

in which the number y is different from zero.

It can be seen that the calculation of the numbers m1 and m2 in the adding and doubling operations requires an inversion calculation. Such an inversion calculation requires a computing time corresponding to that of several tens of multiplications. It is possible to remove the inversion calculation by appropriately selecting a representation of the points of an elliptic curve. For this purpose, one well-known method involves using a representation in projective coordinates, such as the representation in homogeneous or Jacobian projective coordinates. The representation in homogeneous projective coordinates involves replacing the affine coordinates (x, y) with the homogeneous projective coordinates (X, Y, Z) such as X=x·Z, Y=y·Z, Z being different from 0. The equation of the elliptic curve E(a,b) then becomes: $Y^2Z=X^3+aXZ^2+bZ^3$. Conversely, it is possible to come back to the affine coordinates of a point by replacing the homogeneous projective coordinates with the coordinates (x=X/Z, y=Y/Z), Z being different from zero. The change from the affine coordinates to the projective coordinates can be carried out merely by choosing Z equal to 1. It shall be noted that the point at infinity Ø has a zero coordinate Z in Jacobian or homogeneous projective coordinates. The representation in Jacobian projective coordinates involves transforming the affine coordinates (x, y) into coordinates of the form $(X=x\cdot Z^2, Y=y\cdot Z^3, Z)$, Z possibly being chosen equal to 1 or any other non-zero value of the field GF(p). The equation of the elliptic curve E(a,b) then becomes: $Y^2=X^3+aXZ^4+bZ^6$.

The sum of two points P1(X1,Y1,Z1) and P2(X2,Y2,Z2) of the curve E(a,b), in homogeneous projective coordinates provides a point P3(X3,Y3,Z3) such that:

$$\begin{vmatrix} X3 = B \cdot C \\ Y3 = A \cdot (B^2 \cdot X1 \cdot Z2 - C) - \\ B^3 \cdot Y1 \cdot Z2 \\ Z3 = B^3 \cdot Z1 \cdot Z2 \end{vmatrix} \quad (3)$$

with: $\begin{vmatrix} A = Y2 \cdot Z1 - Y1 \cdot Z2 \\ B = X2 \cdot Z1 - X1 \cdot Z2 \\ C = A^2 \cdot Z1 \cdot Z2 - B^3 - 2 \cdot B^2 \cdot X1 \cdot Z2 \end{vmatrix}$ In the equation (3), the point P2 is different from the points P1 and −P1, and the numbers Z1 and Z2 are different from 0 (P1 and P2 are different from the point at infinity Ø). The doubling of a point P(X,Y,Z) of the curve E(a,b), in homogeneous projective coordinates provides a point P4(X4,Y4,Z4) such that:

$$\begin{vmatrix} X4 = B \cdot E \\ Y4 = A \cdot (D - E) - 2 \cdot C^2 \\ Z4 = B^3 \end{vmatrix} \text{ with: } \begin{vmatrix} A = 3 \cdot X^2 + a \cdot Z^2 \\ B = 2 \cdot Y \cdot Z \\ C = B \cdot Y \\ D = 2 \cdot C \cdot X \\ E = A^2 - 2 \cdot D \end{vmatrix} \quad (4)$$

In the equation (4), the number Y is different from zero.

The operations of the equations (1) to (4) are performed in the Galois field GF(p) modulo p. It can be seen that the equations (3) and (4) do not include any inversion operations. According to one embodiment, the calculation block AD1 may implement the equation (1) or (3), and the calculation block DB1 may implement the equation (2) or (4).

FIG. 2 represents an example of a multiplication function SP for multiplying a point of an elliptic curve by a scalar number, executed by the device DV1. The function SP receives as input parameters a point P and a scalar number k and provides the result of the scalar multiplication k⊗P. The scalar number k is represented in a binary form by a succession of a number v of bits. The procedure SP comprises a calculation iteration for each bit of the scalar number k. The procedure SP comprises steps S1 to S11. Steps S1 and S2 are successively executed when the procedure SP is activated. In step S1, a variable R which can receive the coordinates of a point is set to the coordinates of the point at infinity Ø in homogeneous projective coordinates. A loop index s is also set to the value v−1 of the rank of the most significant bit of the scalar number k, and a flag EDS is set to false. Step S2 consists of a test for activating an error detection mode. According to one embodiment, it is considered that the point at infinity Ø cannot appear during an intermediate calculation of a calculation of multiplying an elliptic curve point by a scalar, while the number of processed bits of the scalar number k is lower than the rank of the most significant bit of the order n of the base point G of the cryptographic system. If the point at infinity Ø appears in these conditions at the end of an intermediate processing, this means that an error has occurred, this error possibly being due to an attack on the device DV1. Therefore, in step S2, the number of processed bits, of the scalar number k, equal to v−s, is compared with the rank of the most significant bit of the order n of the point G, i.e. the magnitude $\lfloor \log_2(n) \rfloor$, in which $\lfloor x \rfloor$ represents the whole part of the number x. If the number of processed bits v−s is lower than the magnitude $\lfloor \log_2(n) \rfloor$ and if the flag EDS is lowered (EDS=F), steps S3, S5 and S6 are executed, otherwise steps S4, S5 and S6 are executed. In step S3, the error detection mode is activated for example by raising a flag ED (ED=T). In step S4, the error detection mode is deactivated for example by lowering the flag ED (ED=F). In step S5, a point doubling function DBL is called with the variable R passed as a parameter for calling the function, and sending back the variable R containing the result of the doubling. In step S6, the bit $k_s$ of rank s of the scalar number k is compared with 1. If the bit $k_s$ is equal to 1, steps S7, S8 and S9 are executed, otherwise only step S9 is executed. In step S7, an adding function for adding points ADD is called to add the point P to the point contained in the variable R. The function ADD sends back the result of the addition of points in the variable R. In step S8, the flag EDS is raised (EDS=T). In step S9, the end of the scalar multiplication calculation is tested. Therefore, if the index s is not equal to 0, step S10 is executed to decrement the loop index by 1 and a new iteration of the scalar multiplication calculation is executed from step S2. If the index s is equal to 0, the execution of the procedure SP ends in step S11 where the variable R containing the result of the scalar multiplication calculation is provided at output of the procedure SP. The flag EDS avoids triggering an error mode at the start of the scalar multiplication processing by the detection of a point at infinity during the processing. Indeed, at the start of the processing, the variable R contains the value of the point at infinity Ø while a bit $k_s$ on 1 has not been processed.

FIG. 3 represents steps of the point adding function ADD. The function ADD receives as input parameters points Q1 and Q2 to be added and provides the result of the addition Q1⊕Q2. The function ADD comprises steps S21 to S33. Step S21 executed when the function ADD is activated, involves comparing the points Q1 and at infinity Ø. If the point Q1 is equal to the point at infinity Ø, steps S22 and S31 are executed, otherwise step S23 is executed. In step S22, the variable R receiving the point resulting from the addition, receives the point Q2. In step S23, the points Q2 and at infinity Ø are compared. If the point Q2 is equal to the point at infinity Ø, steps S24 and S31 are executed, otherwise step S25 is executed. In step S24, the variable R receives the value of the point Q1. In step S25, the points Q1 and Q2 are compared. If the points Q1 and Q2 are equal, steps S26 and S33 are executed, otherwise step S27 is executed. In step S26, the point doubling function DBL is called with the point Q1 as parameter. In step S27, the points Q1 and −Q2 are compared. If the points Q1 and Q2 are opposite, steps S28 and S31 are executed, otherwise steps S29 and S30 are executed. In step S28, the variable R receives the value of the point at infinity Ø. In step S29, the points Q1 and Q2 are added, for example by applying the equations (1) or (3), and the variable R receives the result of the addition Q1⊕Q2. In step S30, the point R is compared with the point at infinity Ø. If the point R is equal to the point at infinity Ø, step S31 is executed, otherwise step S33 is executed. In step S31, the error detection mode indicator ED is tested, and if it is active steps S32 and S33 are executed, otherwise only step S33 is executed. Step S32 consists of a call of an error procedure ERR which can send back the value of a point loaded in the variable R. The execution of the function ADD ends in step S33 where the variable R is provided by the function ADD.

It shall be noted that in projective coordinates, steps S27 and S28 can be removed, the adding calculation performed in step S29 leading to a point R equal to the point at infinity if the points Q1 and Q2 are opposite. Step S30 can also be removed given that the comparison with the point at infinity performed in this step will be performed in step S21 or S23 during the current or next iteration of the calculation of multiplying a point by a scalar number (FIG. 2). FIG. 4 represents steps of the point doubling function DBL, according to one embodiment. The function DBL receives as input parameter, a point Q to be doubled and provides the result of the operation 2⊗Q. The function DBL comprises steps S41 to S47. In step S41, the point Q passed as a parameter of the function DBL is compared with the point at infinity. If the point Q is equal to the point at infinity Ø, steps S42 and S44 are executed, otherwise steps S43 and S46 are executed. In step S42, a variable (or a register) R receives the coordinates of the point at infinity Ø. Step S43 consists of the operation of doubling the point Q of which the coordinates of the resulting point are stored by the variable R. This operation can be performed for example by applying the equations (2) or (4). In step S46, the variable R is compared with the point at infinity Ø. If the variable R stores the coordinates of the point at infinity Ø, step S44 is executed, otherwise step S47 is executed. Step S44 involves testing whether the error detection mode is activated (ED=T). If the error detection mode is activated, steps S45 and S47 are executed, otherwise only step S47 is executed. Step S45 consists of a call of an error procedure ERR which can send back the value of a point allocated to the variable R. The execution of the function DBL ends at step S47 where the variable R is provided at output of the function DBL.

It shall be noted that in projective coordinates, steps S41 and S42 can be removed, the doubling calculation performed in step S43 leading to a point R equal to the point at infinity if the point Q is equal to the point at infinity. Steps S44, S45 and S46 can also be removed given that the comparison with the point at infinity performed in step S46 will be performed in step S21 or S23 during the current or next iteration of the calculation of multiplying a point by a scalar number (FIG. 2).

According to another embodiment, the calculation blocks AD1 and DB1 respectively implement the functions ADD and DBL, the function ERR being implemented in one and/or the other of the calculation blocks AD1, DBL. The calculation blocks AD1, DB1 then further receive the indicator ED from the processor PRC.

FIG. 5 represents an example of the procedure ERR. The procedure ERR comprises steps S51 to S53 that are executed successively. In step S51, an error indicator ER is activated. The activation of the indicator ER may then be used by the processor PRC to take any appropriate measure to process the error thus detected by one or other of the functions ADD and DBL. In step S52, the coordinates of a point R are randomly chosen. In step S53, the value of the point R is provided at output of the procedure ERR. It shall also be noted that in step S52, the value of the point R can be defined in other manners, for example selected arbitrarily among one or more values stored in a table, or extracted from a register used during a previous intermediate calculation.

While the detection is active (ED=T), an error detection is performed before and/or after each basic calculation of adding and/or doubling a point of a calculation of multiplying a point by a scalar number. This arrangement avoids an error injection then possibly being used to discover secret data by analyzing the result provided by the scalar multiplication calculation.

FIG. 6 represents another example SP1 of a function for multiplying an elliptic curve point P by a scalar number k, executed by the device DV1, according to another embodiment. The function SP receives as input parameters a point P and a scalar number k and provides the result of the scalar multiplication k⊗P. Here again, the scalar number k is represented in the form of a succession of a number v of bits. The procedure SP1 comprises a calculation iteration for each bit of the scalar number k. The procedure SP1 comprises steps S61 to S71. Steps S61 and S62 are successively executed when the procedure SP1 is activated. In step S61, variables R0, R1 respectively receive the coordinates of the point at infinity Ø and of the point P passed as a parameter for calling the procedure SP1. A loop index s is also set to zero, and a flag EDS is set to false. The index s thus corresponds to the rank of the least significant bit of the scalar number k. Step S62 consists of a test for activating the error detection mode. In the same way as for the function SP, this test involves comparing the loop index s, i.e. the number of processed bits of the scalar number, with the magnitude $\lfloor \log_2(n) \rfloor$ corresponding to the number of bits of the order n of the base point G or to the rank of the most significant bit of the order n. If the number of processed bits s is lower than the magnitude $\lfloor \log_2(n) \rfloor$ and if the flag EDS is raised, steps S63 and S65 are executed, otherwise steps S64 and S65 are executed. In step S63, the error detection mode is activated by raising the flag ED (ED=T). In step S64, the error detection mode is deactivated by lowering the flag ED (ED=F). In step S65, the bit $k_s$ of rank s of the scalar number k is compared with 1. If the bit $k_s$ is equal to 1, steps S66 to S69 are executed, otherwise only steps S68 and S69 are executed. In step S66, the variable R0 receives the result of the addition of the points stored by the variables R0 and R1, provided by the point adding function ADD. In step S67, the flag EDS is raised (EDS=T). In step S68, the point doubling function DBL is called to calculate the double of the point stored by the variable R1, and the point resulting from the doubling is loaded in the variable R1. In step S69, the end of the scalar multiplication calculation is tested. If all the bits of the scalar number k have not been processed (index s lower than v−1), step S70 is executed to increment the loop index s by 1 and a new iteration of the scalar multiplication calculation is performed from step S62. If the index s is equal to v−1, the execution of the procedure SP1 ends at step S71 where the variable R0 containing the point resulting from the scalar multiplication calculation is provided at output of the procedure SP1.

FIG. 7 represents another example SP2 of a function for multiplying an elliptic curve point P by a scalar number k, executed by the device DV1, according to another embodiment. Here again, the scalar number k is represented in the form of a succession of a number v of bits. The function SP2 that is based on the "Montgomery Ladder" algorithm, comprises a calculation iteration for each bit of the scalar number k. The function SP2 comprises steps S81 to S91. Steps S81 and S82 are successively executed when the function SP2 is activated. In step S81, two variables R[0], R[1] of a table R which can each receive the coordinates of a point, respectively receive the coordinates of the point at infinity Ø and of the point P passed as a parameter for calling the procedure SP1. A loop index s is also set to v−1 corresponding to the rank of the most significant bit of the scalar number k, and a flag EDS is set to false (EDS=F). In step S82, the error detection mode activation test is executed. As above, this test involves comparing the number of processed bits v−s of the scalar number k with the magnitude $\lfloor Log_2(n) \rfloor$ and testing the flag EDS. If the number of processed bits v−s is lower than the magnitude $\lfloor Log_2(n) \rfloor$ and if the flag EDS is raised, steps S84 to S88 are executed, otherwise steps S83 and S85 to S88 are executed. In step S83, the error detection mode is deactivated by lowering the flag ED (ED=F). In step S84, the error detection mode is activated by raising the flag ED (ED=T). In step S85, a binary variable b receives the value of the bit $k_s$ of rank s of the scalar number k. In step S86, the variable R[1-b] (variable R[0] or R[1] according to the value of the variable b) receives the sum of the points stored by the variables R[0] and R[1] and provided by the point adding function ADD. In step S87, the point doubling function DBL is called to calculate the double of the point stored by the variable R[b] (variable R[0] or R[1] according to the value of the variable b), and the point resulting from the doubling is loaded in the variable R[b]. In step S88, the value of the variable b is tested to raise the flag EDS if the variable b is on 1 (step S89). In step S90 executed after step S88 or S89, the end of the scalar multiplication calculation is tested. Therefore, if the index s is greater than zero, step S91 is executed to decrement the loop index s by 1 and a new iteration of the scalar multiplication calculation is performed from step S82. If the index s is equal to zero, the execution of the procedure SP2 ends at step S92 where the variable R[0] containing the point resulting from the scalar multiplication calculation is provided at output of the procedure SP2.

It shall be noted that depending on the algorithm used to calculate the product of a point by a scalar number, certain comparison steps performed by the adding function ADD (FIG. 3) may be unnecessary as the tested case cannot arise. Therefore, steps S25 to S28 can be removed, in particular in the event that the multiplication procedure SP2 (FIG. 7) is used.

More generally, depending on the type of Galois field, GF(p) or GF($2^m$), depending on the system of coordinates used, and, if any, depending on the type of projective coordinates, depending on the multiplication algorithm for multiplying by a scalar number used, and depending on the form of the equation of the elliptic curve, the appearance of the point at infinity during the execution of the adding and doubling operations can only be detected on the operands Q1, Q2 of the adding operation (steps S21 and S23), or only on the operand of the doubling operation (step S41), or only on the result of the adding operation (step S30), or only on the result of the doubling operation (step S46).

Furthermore, instead of modifying the resulting point R provided by the adding and doubling operations, these operations may send back the point at infinity, and the appearance of the point at infinity may be detected in the multiplication functions for multiplying by a scalar number of FIGS. 2, 6 and 7, after each call of the adding operation (steps S7, S66, S86) and/or of the doubling operation (steps S5, S68, S87). If the resulting point R provided by the adding or doubling operation is equal to the point at infinity and if the flag ED is activated (ED=T), the multiplication function SP, SP1, SP2 may activate an error indicator that is provided at output of the function, and/or modify the resulting point R, and/or modify the scalar number k.

One or other of the procedures SP, SP1, SP2 may be implemented for example in a public key digital signature algorithm of ECDSA type, executed by the device DV1. The ECDSA algorithm that is implemented in a Galois field of GF(p) or GF($2^m$) type, involves generating a pair of public Q and private r keys. The private key r is a scalar number that can be randomly chosen greater than 1 and lower than or equal to n−1, n being the order of the base point G of the domain parameters of the cryptographic system. The public key Q is chosen equal to r⊗G, G being the generating point of the domain parameters of the cryptographic system. The key Q can thus be calculated using one of the functions SP, SP1, SP2. To sign a message m, the device DV1 randomly generates a number k greater than 1 and lower than or equal to n−1. The device DV1 then calculates the coordinates of the point P(i,j)=k⊗G by calling one of the functions SP, SP1, SP2. If the number x=i mod n is zero (mod n being the function modulo n), the device DV1 randomly generates another number k. The device DV1 then calculates the number y thanks to the following equation:

$$y=k^{-1}(H(m)+r\cdot x) \bmod n, \qquad (5)$$

where H(m) is the result of a hashing function such as SHA-1, applied to the message m. If the number y obtained is zero, the device DV1 starts the calculation of the number y again by generating another value for the number k. The signature is made up of the pair (x, y).

To check the signature (x,y), the device DV1 first checks that the point Q constituting the public key is different from the point at infinity Ø, that this point belongs to the elliptic curve E(a,b), that the product n⊗Q is equal to the point at infinity Ø and that x and y are indeed between 1 and n−1. It shall be noted that the condition n⊗Q=Ø can be checked using the functions SP, SP1, SP2 as the error detection mode is only active during the processing of the bits of the scalar number lower than the rank of the most significant bit of the order n of the base point G. As a result, the processing of the last bit of the number n can (and must) result in the point at infinity Ø. Then, the device DV1 calculates the coordinates of the point P(i,j) thanks to the following equation:

$$P(i,j)=[H(m)\cdot y^{-1} \bmod n]\otimes G \otimes [x\cdot y^{-1} \bmod n]\otimes Q \qquad (6)$$

and checks that the number x is equal to i mod n.

One or other of the procedures SP, SP1, SP2 can be implemented for example in a secret key generation algorithm such as ECDH, or an asymmetric ciphering/deciphering algorithm such as ECIES. According to the ECDH algorithm, a secret key can be generated by two persons wishing to exchange ciphered messages, in the following manner. The two persons chose a point P on a same elliptic curve (choice of a cryptographic system). Each person chooses a whole number, respectively DA, DB, to be kept secret, calculates the product DA⊗P, DB⊗P of the point by the scalar number s/he has chosen, using one of the functions SP, SP1, SP2, and sends the product obtained to the other person. Each person can then calculate the secret key by multiplying the point received DA⊗P, DB⊗P by the number DB, DA s/he has chosen. The secret key can be chosen equal to the affine x or projective X coordinate of the point DA⊗(DB⊗P) that is equal to the point DB⊗(DA⊗P), thus obtained by each of the parties.

According to the ECIES algorithm, a pair of private and public keys (r, Q) can be generated as in the ECDSA algorithm. To cipher a message m, the device DV1 randomly generates a number u between 1 and n−1, and calculates the points R=u⊗G and P(x,y)=u⊗Q, Q being the public key of the recipient of the ciphered message. The point R is the public key of the sender of the message. The point P must be different from the point at infinity Ø. The device DV1 implements a key derivation function KDF to generate symmetric keys Ke, Km, such that (Ke, Km)=KDF(x,S1), S1 being a datum shared with the recipient of the ciphered message. Then, the device DV1 ciphers the message m by implementing a symmetric ciphering algorithm E using the key Ke. The device DV1 then calculates a datum d by applying a hashing function to the key Km and to another datum S2 shared with the recipient of the message. The device DV1 sends the result c of the ciphering of the message m to the recipient of the message, with the datum d and possibly the point R constituting the public key of the sender of the message.

To decipher a ciphered message (c,d), the device DV1 calculates the point P(x,y)=u⊗R (=r⊗Q). The point P obtained must be different from the point at infinity Ø. The device DV1 uses the same key derivation function KDM as the sender of the message and the shared datum S1, to generate the symmetric keys Ke, Km. The device DV1 then calculates the number d1 by using the same formula as the sender of the message, applied to the key Km and to the shared datum S2 to calculate a number d1. If the number d1 obtained is identical to the number d received, the message can be deciphered by applying to the ciphered datum c received, the symmetric deciphering function corresponding to the ciphering function used, using the key Ke.

It will be understood by those skilled in the art that the present invention is susceptible of various alternative embodiments and various applications. In particular, the invention is not limited to the algorithms for multiplying a point by a scalar number, presented in FIGS. 2, 6 and 7, but may apply to algorithms in which several bits of the scalar number are processed upon each iteration. Therefore, the algorithm A1 presented in Appendix I is derived from the algorithm presented on FIG. 6 (without the management of the flags EDS and ED), by applying a two-bit sliding window, i.e. by processing two bits of the scalar number k upon each iteration. The number of iterations to be performed is thus divided by two, by using a set R[ ] of three registers instead of only one register. Each iteration of index i comprises four steps 2.1 to 2.4. Step 2.1 involves calculating a whole number u by combining two consecutive bits $k_{2i}$ and $k_{2i+1}$ of ranks 2i and 2i+1 of the scalar number k. Steps 2.2 and 2.3 involve doubling the point P to be multiplied by the scalar number, loaded in the register D. Step 2.4 which is executed if the number u is non zero, involves adding the point D and the point in the register R[u]. When all the iterations have been performed, the result of the scalar multiplication is obtained by the combination of the values of the registers R[1]⊕2⊗R[2]3⊗R[3].

The algorithm A2 presented in Appendix I is a generalization of the algorithm A1 to a sliding window of m bits, i.e. by processing m bits $k_i$ of the scalar number k upon each iteration. The application of such a sliding window thus enables the number of iterations to be reduced to a number equal to the number of bits of the scalar number divided by m. However, this reduction is obtained to the detriment of the number of adding and doubling operations to be performed (in step 4) to obtain the final result, this number of operations increasing in an exponential manner (in $2^m$). Steps 1 and 2 enable a register D to be set to the value of the point P to be multiplied by the scalar number k, and $2^m-1$ registers R[j] to be set to the value of the point at infinity. Each iteration comprises a calculation loop (steps 3.1, 3.1.1 ) of a number u calculated using the bits of the scalar number to be processed upon the iteration, a calculation loop (3.1.2) to double m times the point stored in the register D, and an adding operation to add the point in the register D to the point in the register R[u].

Furthermore, other projective models may be implemented while remaining within the framework of the present invention as defined by the enclosed claims. Therefore, the present invention may be implemented with:

the Jacobian projective model modified using the coordinate system $(X=x \cdot Z^2, Y=y \cdot Z^3, Z, T=a \cdot Z^4)$, a being one of the parameters (a,b) of the elliptic curve, the projective model W12 using the coordinate system $(X=x \cdot Z, Y=y \cdot Z^2, Z)$, the projective model XYZZ using the coordinate system $(X=x \cdot ZZ, Y=y \cdot ZZZ, ZZ, ZZZ)$, with $ZZ^3=ZZZ^2$, or even the projective model XZ using the coordinate system $(X=x \cdot Z, Z)$.

Appendix I (being an Integral Part of the Description)

Algorithm A1—"Double & Add Only" Scalar Multiplication

Input: a point P belonging to the elliptic curve E on the Galois field a whole scalar k of v bits such that $k=(k_{v-1} \, k_{v-2} \ldots k_0)_2$ Requires: a set R of three registers of the size of the point P a register D of the size of the point P Output: k⊗P Step 1: R[1]=Ø; R[2]=Ø; R[3]=Ø; D=P Step 2: for i ranging from 0 to $$\left\lceil \frac{v}{2} \right\rceil - 1,$$

do:

Step 2.1: $u=k_{2i}+2k_{2i+1}$

Step 2.2: D=2⊗D (DBL)

Step 2.3: D=2⊗D (DBL)

Step 2.4: if u≥1 then R[u]=R[u]⊕D (ADD)

Step 3: R[1]=R[1]⊕R[3]⊕2⊗(R[2]⊕R[3]) (ADD, DBL)

Step 4: Send back R[1]

⌈x⌉ representing the smallest whole number greater than or equal to x

Algorithm A2—"Double & Add Only" Scalar Multiplication

Input: a point P belonging to the elliptic curve E on the Galois field a whole scalar k of v bits such that $k=(k_{v-1} \, k_{v-2} \ldots k_0)_2$ Requires: a set R of $2^m-1$ registers of the size of the point P (m>2)

a set of $$\left\lceil \frac{v}{m} \right\rceil$$

registers DP of the size of the point P such that $$DP[i] = [2^{m \cdot i}] \cdot P, \text{ for } 0 \le i < \lceil \frac{v}{m} \rceil$$

Output: k⊗P
Step 1: D=P
Step 2: for j ranging from 1 to $2^m-1$, do R[j]=∅
Step 3: for i ranging from 0 to $$\lceil \frac{v}{m} \rceil - 1,$$

do:
Step 3.1: for j ranging from 0 to m−1, do:
Step 3.1.1: u=$2^j \cdot k_{m \cdot i+j}$ (with ki=0 if i>v−1)
Step 3.1.2: D=2⊗D (DBL)
Step 3.2: if u≥1 then R[u]=R[u]⊕D (ADD)
Step 4:

$$R[1] = \sum_{j=1}^{2^m-1} j \otimes R[j]$$

(ADD, DBL)
Step 5: Send back R[1]
Σ represents the adding operator for adding points in the group of points of the elliptic curve, with coordinates in the Galois field.

The invention claimed is:

1. A method in an elliptic curve cryptographic system, the method comprising:
    executing, by a processor of an electronic device, a cryptographic calculation including a multiplication operation multiplying a point of an elliptic curve by a scalar number, the point having affine coordinates belonging to a Galois field;
    detecting, by the processor, an appearance of a point at infinity during intermediate calculations of the multiplication operation;
    activating, by the processor, an error signal when the point at infinity is detected and before a number of bits of the scalar number processed by the multiplication operation equals or exceeds a rank of a most significant bit of an order of a base point of the cryptographic system; and
    when the error signal is active, performing following operations of the intermediate calculations with at least one arbitrary value.

2. The method of claim 1, further comprising activating the error signal when the point at infinity is detected as an input of an intermediate calculation of the multiplication operation if at least one of an adding of adding a point has been executed and a doubling operation of doubling a point has been executed.

3. The method of claim 1 wherein the intermediate calculations include an addition of points of the elliptic curve.

4. The method of claim 1, wherein the intermediate calculations include an operation of doubling a point of the elliptic curve.

5. The method of claim 1, further comprising activating, by the processor, an error detection mode only when the number of processed bits of the scalar number is less than the rank of the most significant bit of the order of the base point, wherein the error signal can only be activated when the error detection mode is activated.

6. The method of claim 1, further comprising detecting, by the processor, the appearance of the point at infinity, at least one of: before an operation of adding points of the elliptic curve, after the operation of adding points of the elliptic curve, before an operation of doubling a point of the elliptic curve and after the operation of doubling a point of the elliptic curve.

7. The method of claim 1, further comprising, when the error signal is active, using, by the processor, as a point resulting from one of the intermediate calculations, a point having an arbitrary value.

8. The method of claim 1, further comprising, when the error signal is active, allocating, by the processor, an arbitrary value to the scalar number.

9. An electronic device comprising:
    a processor configured to:
        execute a cryptographic calculation including a multiplication operation multiplying a point of an elliptic curve by a scalar number, the point having affine coordinates belonging to a Galois field;
        detect an appearance of a point at infinity during intermediate calculations of the multiplication operation;
        activate an error signal when the point at infinity is detected and before a number of bits of the scalar number processed by the multiplication operation equals or exceeds a rank of a most significant bit of an order of a base point of a cryptographic system of the electronic device; and
        when the error signal is active, perform following operations of the intermediate calculations with at least one arbitrary value.

10. The electronic device of claim 9, further comprising an adding calculation block for calculating an addition of points of the elliptic curve and a doubling calculation block for calculating a doubling of a point of the elliptic curve.

11. The electronic device of claim 10, wherein at least one of the adding calculation block and the doubling calculation block is configured to detect the appearance of the point at infinity, and to activate the error signal if an error detection mode is activated.

12. The electronic device of claim 10, the processor being further configured to detect the appearance of the point at infinity and to activate the error signal, if an error detection mode is activated, at least one of: before the adding calculation block is activated to perform an adding operation, after the adding calculation block is activated to perform the adding operation, before the doubling calculation block is activated to perform a doubling operation, and after the doubling calculation block is activated to perform the doubling operation.

13. The electronic device of claim 9, wherein the processor is further configured to activate the error signal when the point at infinity is detected as an input of an intermediate calculation of the multiplication operation when at least one of a point adding operation is executed and a point doubling operation is executed.

14. The electronic device of claim 9, wherein the intermediate calculations include an addition of points of the elliptic curve.

15. The electronic device of claim 9, wherein the intermediate calculations include an operation of doubling a point of the elliptic curve.

16. The electronic device of claim 9, wherein the processor is further configured to activate an error detection mode only when the number of processed bits of the scalar number is less than the rank of the most significant bit of the order of the base point, wherein the error signal can only be activated when the error detection mode is activated.

17. The electronic device of claim 9, wherein the processor is configured to detect the appearance of the point at infinity, at least one of: before an operation of adding points of the elliptic curve, after the operation of adding points of the elliptic curve, before an operation of doubling a point of the elliptic curve and after the operation of doubling a point of the elliptic curve.

18. The electronic device of claim 9, wherein the processor is further configured, when the error signal is active, to use, as a point resulting from one of the intermediate calculations, a point having an arbitrary value.

19. The electronic device of claim 9, wherein the processor is further configured, when the error signal is active, to allocate an arbitrary value to the scalar number.

* * * * *